United States Patent [19]
Laine et al.

[11] Patent Number: 5,958,361
[45] Date of Patent: Sep. 28, 1999

[54] ULTRAFINE METAL OXIDE POWDERS BY FLAME SPRAY PYROLYSIS

[75] Inventors: Richard M. Laine, Ann Arbor, Mich.; Clint R. Bickmore, Beverly, Mass.; David R. Treadwell, Ann Arbor; Kurt F. Waldner, Royal Oak, both of Mich.

[73] Assignee: Regents of the University of Michigan, Ann Arbor, Mich.

[21] Appl. No.: 08/562,296

[22] Filed: Nov. 22, 1995

Related U.S. Application Data

[63] Continuation-in-part of application No. 08/371,911, Jan. 12, 1995, Pat. No. 5,614,596, which is a continuation-in-part of application No. 08/034,531, Mar. 19, 1993, Pat. No. 5,418,298.

[51] Int. Cl.$^6$ .......................... C01G 23/047; C01F 7/02; C01F 1/00
[52] U.S. Cl. .......................... 423/592; 423/593; 423/625; 423/610
[58] Field of Search .................................... 423/592, 593, 423/278, 335, 624, 625, 618, 619, 608, 609, 610, 635, 641

[56] References Cited

U.S. PATENT DOCUMENTS

| | | | |
|---|---|---|---|
| 5,075,090 | 12/1991 | Lewis et al. | 423/337 |
| 5,358,695 | 10/1994 | Helble et al. | 423/592 |
| 5,622,750 | 4/1997 | Kilian et al. | 427/376.2 |

OTHER PUBLICATIONS

Chandler,C.D. et al, "Generation of matal titante powders by spray pyrolysis . . ." J. Mater. Chem. 3(7), pp. 775–776, Dec. 1993.
Kim,H. et al, "Preparation of spherical Pb(Zr,Ti)O3 powders by ultrasonic spray pyrolysis" J. Mater. Sci. Mater. Electron. 6(2), pp. 84–89, Feb. 1995.
R.D. Shull, "Viewpoint: Nanocrystalline and Nanophase Materials," Nanostructured Materials, 2 213–16 (1993), no month.
H.Gleiter, "Materials with Ultrafine Microstructures: Retropspectives and Perspectives", Nanostructured Materials, 1, 1–19 (1992), no month.
H. Hahn, Microstructure and Properties of Nanostructured Oxides, Nanostructured Materials, 2, 251–65 (1993), no month.
R. Birringer, H. Gleiter, H.P. Klein, and P. Marquardt, "Nanocrystalline Materials, etc." Pysi. Lett. A., 102, 365 (1984), Jun.
H.Hahn and R.S. Averback, "High Temperature Mechanical Properties of Nanostructured Ceramics," Nanostructured Materials, 1, 95–100 (1992), no month.
A. Gurav, T. Kodas, T. Pluym, Y. Xiong, "Aerosol Processing of Materials", Aerosol Science and Technology, 19, 411–52 (1993), no month.
H.J. Lee, K. Eguchi, and T. Yoshida, "Preparation of Ultrafine Silicon Nitride, and Silicon Nitride and Silicon Carbide Mixed Powders in a Hybrid Plasma," J.Am.Cer. Soc.73 [11] 3356–62 (1990), no month.

K.–H. Kim, C–H Ho, H. Doerr, C. Deshpandey, and R.F. Bunshah, "Ultrafine Aluminum Nitride Powder Produced by Plasma–Assisted Chemical Vapor Desposition of Trimethyl–aluminum," J.Mat.Sci., 27 2580–88 (1992), no month.
S.C. Danforth, "Synthesis and Processing of Ultrafine Powders for $Si_3N_4$ Ceramics," Nanostructured Materials, 1, 197–202 (1992), no month.
M.J. Mayo, D.C. Hague, and D–J. Chen, "Processing Nanocrystalline Ceramics for Application in Superplasticity," Mat. Sci. And Eng., A166, 145–59 (1993), no month.
X.Li, H.Zang, J.Guan, L.Ziao, Z.Wang, and M.Zhao, "Synthesis of Nanocrystalline Materials of Composite Oxides Based on $BaTiO_3$ by Using Stearic Acid–Sol Method," Nanostructured Materials, 2, 457–62 (1993), no month.
G.L. Messing, S–C. Zhang, G.V. Jayanthi, "Ceramic Powder Synthesis by Spray Pyrolysis," J.Am. Cer. Soc., 76 [11] 2707–26, Nov. 1993.
H. Gleiter, in Deformation of Polycrystals: Mechanisms and Microstructures, N.Hansen, A. Horsewell, T.Leffers, H. Lilholt, eds., Riso Nat'l Lab., Rackilde, Denmark p. 15–21 (1981), no month.
P.R. Strutt, K.E. Gonsalves, T.D. Xiao, "Synthesis of Polymerized Preceramic Nanoparticle Powders by Laser Irradiation of Metalorganic Precursors." Nanostructured Materials 1 [1] 21–5 (1992), no month.
"Formation of $SiO_2$, $Al_2O_3$, and $3Al_2O_3$ $2SiO_2$ Particles in a Counterflow Diffusion Flame", S–L Chung, Y–C. Sheu, et al, J.Am. Ceram. Soc. 75, pp. 117–123, no date.
"Aeorsol Synthesis of Aluminum Nitride Powder Using Metalorganic Reactants", A.A. Adjaottor and G.L. Griffin, J.Am.Ceram.Soc. 75[12] 3209–14 (1992), no month.
"Ultrafine–Grained Dense Monoclinic and Tetragonal Zirconia", G.Skandan, et al, J.Am.Ceram.Soc. 77(7) 1706–10 (1994), no month.
"Submicronic $MgAl_2O_4$ Powder Synthesis in Supercritical Ethanol" M.Barj, et al Journal of Materials Science 27 (1992) 2187–2192, no month.
"Formation of Dense and Non–Agglomerated Lead Oxide Particles by Spray Pyrolysis", F.Kirkbir, et al, Journal of Materials Science 27 (1992) 1748–1756, no month.
"Processing of Silicon Carbide–Mullite–Alumina Nanocomposites", Yoshio Sakka, J.Am.Ceram.Soc. 78 [2], 479–86 (1995), no month.

(List continued on next page.)

*Primary Examiner*—Steven Bos
*Attorney, Agent, or Firm*—Brooks & Kushman P.C.

[57] ABSTRACT

Ultrafine metal oxide and mixed metal oxide ceramic particles are prepared by flame spray pyrolysis of a ceramic precursor solution containing one or more gycolato polymetallooxanes dissolved in a volatile organic solvent. Recycle of the nanosized particles disposed in additional ceramic precursor solution leads to larger particles. The metal oxide and mixed metal oxide particles may be converted to the respective nitrides by high temperature ammonolysis. The process produces high quality ceramic particles from inexpensive and relatively non-toxic reagents in high space-time yield.

18 Claims, 7 Drawing Sheets

OTHER PUBLICATIONS

"Synthesis of solid, Spherical Zirconia Particles by Spray Pyrolysis", S–C. Zhang and Gary L. Messing, J. Am. Ceram. Soc. 73 [1] 61–67 (1990), no month.

"Preparation of Monodisperse, Spherical Alumina Powders from Alkoxides", J. Am. Ceram. Soc. 74 [9] 2263–69 (1991), no month.

"Synthesis of Submicrometer Mullite Powder via High–Temperature Aerosol Decomposition", K. A. Moore, et al, J. Am. Ceram. Soc. 75 [1], 213–15 (1992), no month.

"Nanostructured $Y_2O_3$: Synthesis and Relation to Microstructure and Properties", G.Skandan, et al, Scripta Metallurgica Et Materialia, vol. 25, pp. 2389–2393 (1991), no month.

"Fabrication of Transparent $Y-Al_2O_3$ from Nanosize Particles", Marcia R. Gallas, et al, J.Am.Ceram.Soc. 77 [8], 2107–12 (1994), no month.

"Selection of Structural Type and Particle Size in Titanium (IV) Oxide", M.Vallet–Regi, et al, J. Mater. Res., vol. 8, No. 9, pp. 2336–2343, Sep. 1993.

"Hydrothermal Preparation of Uniform Nanosize Rutile and Anatase Particles", H. Cheng, et al, Chem. Mater. 1995 7, 663–671, no month.

"Texture Evolution of $SnO_2$ Synthesized by Pyrolysis of an Aerosol", M. Vallet–Regi, et al, J. Mater. Res., vol. 8, No. 1, Jan. 1993.

"Flame Synthesis of Fine Particles" Gael D. Ulrich, Univ. of New Hampshire, C&EN, Aug. 1984.

"Low–Temperature Creep of Nanocrystalline Titanium (IV) Oxide", H.Hahn and S. Averback, J. Am. Ceram. Soc. 74 [0] pp. 1–4 (1991), no month.

"Preparation of Fine Multicomponent Oxide Ceramic Powder by a Combustion Synthesis Process" Y. Zhang, G. Stangle, J. Mater. Res., vol. 9, No. 8, pp. 1997–2004, Aug. 1994.

Brochure: Particle Technology, Inc. —Statement of Capabilities, no date.

"Preparation of Small Particle Stabilized Zirconia by Aerosol Pyrolysis" A.R. Pebler, J. Mater. Res., vol. 5, No. 4, pp. 680–682, Apr. 1990.

ULTRAFINE METAL OXIDE POWDERS BY FLAME SPRAY PYROLYSIS

CROSS-REFERENCE TO RELATED APPLICATION

This application is a continuation-in-part of U.S. application Ser. No. 08/371,911, filed Jan. 12, 1995, now U.S. Pat. No. 5,614,596, which is herein incorporated by reference. U.S. application Ser. No. 08/371,911, filed Jan. 12, 1995, now U.S. Pat. No. 5,614,596 which is a continuation-in-part of Ser. No. 8/034,531, filed Mar. 3, 1993, now U.S. Pat. No. 5,418,298.

LICENSING RIGHTS

The subject matter was developed in part with United States government support under Contract Nos. DAAL-91C-0068 and DAAL01-93-M-S522 of the Department of the Army. The government has certain rights in this invention.

TECHNICAL FIELD

The present invention pertains to ultrafine metal oxide and mixed metal oxide powders and to a process for the preparation thereof. More particularly, the present invention pertains to ultrafine metal oxide and mixed metal oxide powders prepared by flame pyrolysis of neutral, ionic, or mixed neutral/ionic glycolato polymetallooxanes dissolved in a volatile, flammable organic solvent. A process for preparation of the corresponding metal nitrides is a further aspect of the subject invention.

DESCRIPTION OF THE RELATED ART

Ultrafine (2–500 nm) and fine (1–20 $\mu$m) ceramic particles have numerous uses. Properties of interest in the preparation of ceramic materials with ultrafine grain structure include superplasticity; low temperature sintering; high hardness; high surface area, particularly in catalyst and sensor applications; size-induced transformations/phase stability; and optical transparency in ceramics and powder filled polymers. The large surface areas of ultrafine particles and their optical transparency to visible light create opportunities for use as rheology control additives and sunscreen additives (U.V. opaque) in numerous consumer products where transparency is viewed as a desirable property.

To date, use of such fine and superfine ceramic particle powders has been severely limited due to the cost of such powders. In general, intensive grinding (milling) of substances such as alumina or titania to produce fine powders has not been commercially successful, as the process is both time and energy intensive, and generally results in particles of non-regular shape and broad particle size distribution. It is very difficult to obtain ultra-fine powders simply by milling.

Several processes have been proposed to produce ultrafine ceramic particles. Techniques can be roughly classified into three categories, two based on the phase in which processing occurs, i.e. the gas and liquid phases, the third being hybrid aerosol techniques.

Gas phase syntheses include metal vapor condensation and oxidation, sputtering, laser-ablation, plasma-assisted chemical vapor deposition, and laser-induced chemical vapor deposition. Liquid phase processing encompasses precipitation techniques, and sol-gel processing. Aerosol techniques include spray drying, spray pyrolysis, and flame oxidation/hydrolysis of halides.

A critical factor in the wide-scale investigation and use of ultrafine powders is the high cost associated with producing significant quantities of ultrafine ceramic powders coupled with the difficulty in producing powders without hard agglomerates. High costs result from any combination of: (1) relatively low production rates, (2) capital-intensive equipment, and (3) expensive starting materials, depending on the technique being used and the product desired. In addition, inhomogeneity within the individual particles is often encountered when producing multimetallic ceramic powders, as disclosed in G. L. Messing, S-C. Zhang, G. V. Jayanthi, "Ceramic Powder Synthesis by Spray Pyrolysis, J. AM. CERAM. SOC., 76 [11] 2707–26 (1990).

Of the aerosol processing techniques available for production of ceramic powders, spray pyrolysis and flame oxidation of halides are the primary methods used to produce ultrafine powders. In both methods, submicron to micron sized droplets of solutions of metal salts or alkoxides are produced by standard aerosolization techniques. In spray pyrolysis, the resulting aerosol is thermolyzed (see FIG. 1), to pyrolytically convert the aerosol droplet to an individual ceramic particle of the same stoichiometry as the parent solution. Thermal events in the process include solvent evaporation, solute precipitation, thermal conversion of the precipitate to a ceramic, and sintering of the particle to full density.

Spray pyrolysis is most commonly used for the preparation of monometallic ceramic powders. The resultant powders typically have sizes in the 100–10,000 nm range and are frequently polycrystalline. Hollow particles and fragments of hollow particles are often produced if processing conditions are not carefully adjusted. Attempts to produce multimetallic oxide powders often lead to crystallites of different stoichiometry within each particle as a result of differences in the rates of precipitation of the metals, as salts or hydroxides, from solution. In addition, the particle sizes produced are controlled by the size of droplets within the aerosol and the weight percent dissolved solids in the solution. The final particle size decreases with smaller initial droplet sizes and lower concentrations of dissolved solids in solution. Unfortunately, precursor aerosolization rates, and thus production rates, generally decrease as droplet sizes decrease as one moves from mechanical atomization techniques, such as high velocity shear, to ultrasonic atomization and other more complex methods. A lower concentration of dissolved solids also has the effect of decreasing production rates. Thus, spray pyrolysis can produce ultrafine particles only by sacrificing production rates. Furthermore, single crystal oxide and multimetallic oxide powders are very difficult to produce.

With reference to FIG. 1, during spray pyrolysis, an aerosol droplet 1 containing a precursor dissolved in solvent, is subject to evaporation 2 during which the aerosol droplet is reduced in size and converted to a heterogenous particle containing precipitated solids 3 on the exterior and a solution of precursor 4 on the interior. Further heating effects drying and decomposition 5 to form a solid particle 6 containing mixed amorphous oxides and hydroxides, which upon sintering 7 leads to fully dense polycrystalline particles 8 and/or porous or hollow polycrystalline particles 9.

Flame oxidation of halide aerosols is the most common technique for the large-scale production of ultrafine ceramic powders. An aerosol droplet of halide is oxidized/hydrolyzed in a flame to form a "ceramic vapor" of metaloxide molecules. This "vapor" then condenses to form particles via a nucleation and growth mechanism coupled with significant particle coalescence. See, e.g., A. Gurav, T.

Kodas, T. Pluym, Y. Xiong, "Aerosol Processing of Materials", AEROSOL SCIENCE AND TECHNOLOGY, 19 411–52 (1993). The flame oxidation process is similar to the gas-phase syntheses shown in FIG. 2. Both titania, used in the paint industry, and silica, used primarily for polymer reinforcement, are produced in multi-ton quantities by flame oxidation/hydrolysis of their respective chlorides, $TiCl_4$ and $SiCl_4$. Use of these techniques generate large quantities of corrosive and toxic HCl and in addition require toxic reagents and expensive highly reactive precursors.

Gas phase syntheses of ultrafine ceramic powders use a wide variety of precursors, energy sources, and processing techniques. The mechanism for generation of an ultrafine ceramic begins with a vapor generated from either a metallic or ceramic solid or a gas or volatile liquid, e.g. gaseous $SiH_4$. Vapor generated from a gas or liquid is thermally converted to a vapor of inorganic species. See, e.g., H. J. Lee, K. Eguchi, and T. Yoshida, "Preparation of Ultrafine Silicon Nitride, and Silicon Nitride and Silicon Carbide Mixed Powders in a Hybrid Plasma", J. AM. CER. SOC., 73[11] 3356–62 (1990); and K-H. Kim, C-H. Ho, H. Doerr, C. Deshpandey, and R. F. Bunshah, "Ultrafine Aluminum Nitride Powder Produced by Plasma-Assisted Chemical Vapor Deposition of Trimethylaluminum", J. MAT. SCI., 27 2580–88 (1992). Particles a few atoms in diameter nucleate from the supersaturated vapor, and subsequently grow and coalesce to form ultrafine particles ranging from 1–100 nm in diameter. FIG. 2 shows the steps and intermediate products in a gas-phase ultrafine ceramic powder synthesis using a gas or volatile liquid precursor. When metallic precursors are used, the resulting ultrafine metallic particles are oxidized or nitride in a subsequent step to produce the corresponding oxides or nitrides, respectively.

To date, homogeneous ultrafine, multimetallic powders have not been produced using flame oxidation of metal halide aerosols. The literature suggests that different vapor pressures of the product metal oxides lead to different nucleation and growth rates of the respective oxides from the vapor phase, with the oxide having the lower vapor pressure condensing first to form solid particles. Subsequent condensation of the second metal oxide, both as monometallic particles and as a coating on the existing particles, leads to inhomogeneity both within each particle and between particles. A. Gurav et al., op.cit. Finally, there is a strong likelihood that there will soon be legislation/regulation of chlorine use in the environment that may limit future use of flame oxidation of halides as a route to ultrafine ceramic powders for technical use.

An additional alternative to flame spray pyrolysis involves the thermal evaporation and condensation of a metal under high vacuum, "the inert-gas condensation technique", which provides metal particles as small as 5 nm. H. Gleiter, in *Deformation of Polycrystals: Mechanisms and Microstructures*, N. Hansen, A. Horsewell, T. Lefers, H. Lilholt, eds., Riso National Lab., Rackilde, Denmark, p. 15 (1981). The metallic particles are condensed on a cold-finger and then oxidized by backfilling the vacuum chamber with pure oxygen. The resulting powders have low levels of impurities and particle surfaces nearly free of contamination. The process of evaporating the metals in a high vacuum is very energy and equipment intensive, thus powders produced by this batch method are quite expensive. It is difficult to produce large quantities of particles. Production rates are typically of the order of grams to tens of grams per hour. There are no literature reports which suggest that homogeneous, multimetallic powders can be produced using this method.

Still another approach to processing ultrafine powders relies on plasma and laser induced decomposition of volatile inorganic, organometallic and metalloorganic precursors in the gas phase (see FIG. 2). These methods are the most common techniques for processing ultrafine non-oxide powders, specifically nitrides and carbides. H. J. Lee et al. and K-H. Kim et al., op.cit. Typical syntheses involve passing a volatile precursor in a controlled atmosphere through a plasma, laser beam, or furnace, which provides the activation energy necessary to convert the precursor to a ceramic. Strutt et al. have synthesized silicon nitride powders by laser-driven reaction of various silane (e.g. $SiH_4$ and $Si_2H_6$) precursors and $NH_3$. P. R. Strutt, K. E. Gonsalves, T. D. Xiao, "Synthesis of Polymerized Preceramic Nanoparticle Powders by Laser Irradiation of Metalorganic Precursors", NANOSTRUCTURED MATERIALS 1[1] 21–5 (1992). Silicon carbonitride powders can be produced via a plasma induced reaction of $SiCl_4$ with $CH_4$ and $NH_3$. This processing approach is also equipment and energy intensive and presents difficulties in processing mixed metal powders. Furthermore, powder production rates are typically of the order of milligrams to a few grams per hour.

FIG. 2 illustrates the gas phase synthesis of monometallic oxide or non-oxide ceramics from a metalloorganic gas or volatile liquid precursor. At 201 are metalloorganic compounds (A=metal, R=alkoxy or aryloxy ligand) in the gas phase. Upon thermal decomposition 202, ceramic vapor particles 203 form and nucleate 204 forming ceramic particles 205 which continue nucleation, growth, and coalescence 206 to form the ceramic powder 207. A necked particle is shown at 208.

U.S. Pat. No. 5,075,090 discloses the formation of particles in the micron range (0.2–0.3 $\mu$m) by flame spray pyrolysis of metal alkyls dissolved in a combustible solvent such as hexane or kerosene. The particles produced by this process are not in the nanosize range and are contaminated with relatively large amounts of carbon. Moreover, the metal alkyls, such as triethylaluminum are both expensive as well as highly and spontaneously flammable. The choice of solvent is limited, as metal alkyls react rapidly and often explosively with protic solvents such as methanol and ethanol, and even with water.

In U.S. Pat. No. 5,358,695 is disclosed a process for the manufacture of nanosize metal oxide and metal carbide ceramic particles by preparing particles containing the corresponding metal nitrate or acetate associated with a solid carbonaceous support, and introducing these particles into a high temperature, oxygen rich combustion zone, combusting the solid support and forming metal oxide powders by condensation of low vapor pressure ceramic species. Alternately, the solid fuel, typically a carbohydrate, is dissolved in water with the metal salt and sprayed into a heated zone that evaporates the water and then the resulting dry particles are combusted. In a continuous process, an aqueous solution of sucrose and zirconium or magnesium nitrate is dispersed into a low temperature (300–350° C.) drying and carbonization zone, producing an aerosol of dry particles, following which the aerosol continues its passage into a high temperature oxidation zone maintained at c.a. 1250° K. to 1500° K.

The process of U.S. Pat. No. 5,358,695 has several drawbacks, however, First, an aerosol of dry, carbonaceous particles must first be produced. Additionally, these carbonaceous particles, containing metal nitrates, are potentially explosive, and if the residence time in the oxidizing atmosphere is insufficient or the temperature too low, the desired metal oxide particles may be contaminated with residual carbon. The yield of the process disclosed is also low, being in the range of only 0.1 to 0.2 grams per minute. Finally, since the ceramics are said to condense from the gas phase, heterogenous multi-metal oxide particles are expected within the particles, and stoichiometry is expected to vary between particles, as described by G. L. Messing et al., op.cit.

Prior art methods of preparing nanosized powders are particularly problematic when ceramic materials containing two or more metals in specific stoichiometric ratios are desired. Examples are sillimanite and mullite, both aluminum silicates; spinel, a magnesium aluminum oxide; forsterite, a magnesium silicate; and zircon, a zirconium silicate. Feeding of two metal oxide precursors, e.g. metal hydrides or chlorides at the correct stoichiometric ratio has, in general, not been successful, as condensation of solid materials from the vapor phase tends to favor precipitation of the least volatile of the oxides. Thus, when magnesium oxide precursor and aluminum oxide precursors are used, the expected product will contain, in addition to crystalline magnesium aluminum oxide, crystals of magnesium oxide, aluminum oxide, and many polycrystalline particles containing crystallites of both the latter compounds. While such products may be useful for certain purposes, they do not have the homogeneity desired to form pure ceramic materials.

The ceramic precursors utilized heretofore have, in general, been expensive, toxic, polluting and dangerous materials. Examples are $SiCl_4$ and $TiCl_4$, both exceptionally reactive, toxic gases. Metal alkoxides have also been used, for example trialkoxyaluminum, tetraalkoxysilanes, and titanates, for example $Al(OiBu)_3$, $Si(OEt)_4$, and $Ti(Oi-Bu)_4$. However, such compounds are highly moisture sensitive, and in many cases highly flammable and therefore difficult to handle safely.

It would be desirable to provide a process for the rapid production of nanosized ceramic materials; which utilizes inexpensive and chemically stable ceramic precursors; and which is capable of producing mixed metal ceramic materials with correct stoichiometry and particle homogeneity.

SUMMARY OF THE INVENTION

It has now been unexpectedly discovered that ultrafine and fine ceramic particles of high homogeneity may be prepared by the flame spray pyrolysis of a glycolato polymetallooxane precursor dissolved in a volatile, combustible solvent. The glycolato polymetallooxane may contain two or more metals in non-stoichiometric or stoichiometric ratios, the latter providing mixed-metal ceramic materials of high uniformity, both within the ceramic particles and between particles. Recycle of smaller size particles into the flame spray pyrolysis unit, dispersed in a further glycolato polymetallooxane solution, may be used to prepare ceramic particles in the higher size range, i.e., in the micron range. Ammonolysis of the ultrafine particles may be used to prepare the corresponding metal nitrides.

DETAILED DESCRIPTION OF THE INVENTION

Figure 1:
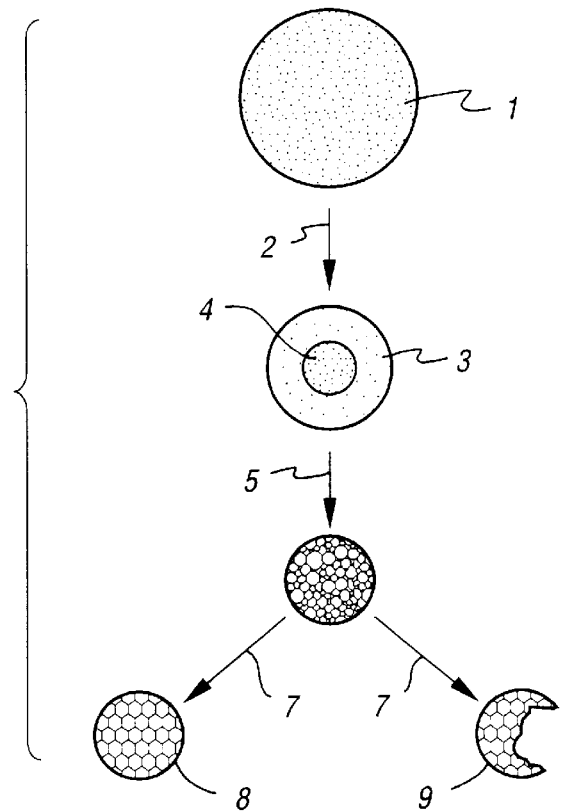
FIG. 1 represents a schematic of particle formation during spray pyrolysis.
Figure 2:
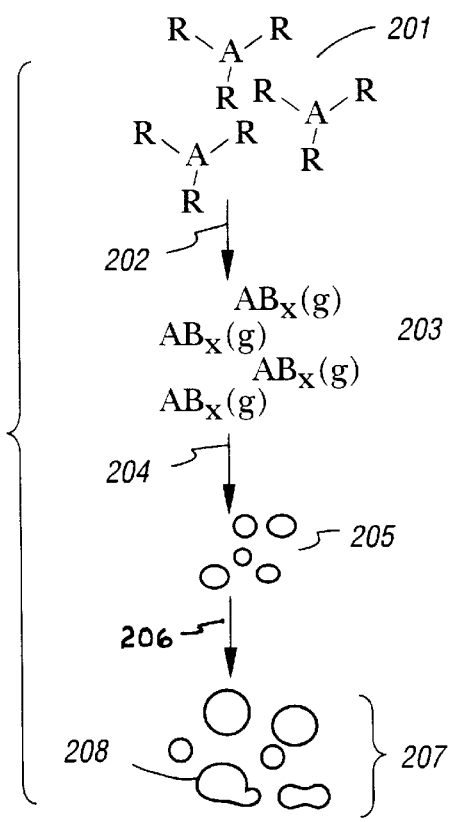
FIG. 2 represents a schematic of synthesis of monometallic oxide or non-oxide ceramics from a metalloorganic gas or volatile liquid precursor.

In the process of the subject invention, a glycolato polymetallooxane ceramic precursor is dissolved into a flammable organic solvent in which it is soluble, and aerosolized into a flame spray pyrolysis reactor in the presence of excess oxygen. The volatile solvent vaporizes and burns, and the precursor oxidatively decomposes (burns), losing all organic moieties, to produce stoichiometrically correct metal oxide vapors that condense rapidly in the steep temperature gradient to form nanosized spherical particles of metal oxide ceramic materials. The ceramic materials are collected downstream from the pyrolysis chamber, preferably through the use of electrostatic precipitators.

By the term glycolato polymetallooxane is meant a neutral, ionic, or mixed neutral ionic polymetallooxane containing at least one glycolato linkage as herein defined. Preferably, the glycolato polymetallooxanes are oligomeric or polymeric species containing more than one metal atom. Mixed metal glycolato polymetallooxanes are also preferred when mixed metal oxide ceramics are desired. Such mixed metal glycolato polymetallooxanes contain two different metals within the majority of polymetallooxane molecules, generally in a specific stoichiometric ratio corresponding to the stoichiometric ratio of the desired ceramic material.

By the term "glycolato" polymetallooxane is meant a polymetallooxane containing minimally one glycolato linkage. A glycolato linkage as herein defined comprises a linkage between one or more metal atoms and two or more oxygen atoms from an at least dihydroxyl (glycol) functional organic molecule. The linkages in question may be between two different metal atoms, e.g.

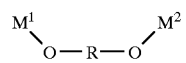

on the same metal atom, e.g.

or combinations of such linkages, e.g.

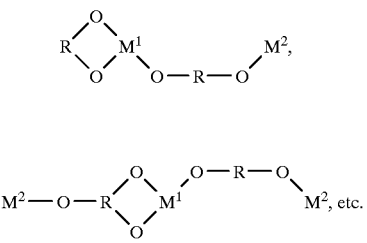

In the foregoing structures, only the metalglycolato linkages are shown. The metal atoms are in general further bound to other organic groups or further glycolato groups to satisfy their valence requirements, whether charged or uncharged species.

As indicated, the glycolato moiety is at least dihydroxyl functional, i.e. is at least a glycol, but may have three or more hydroxyl functional groups and in addition may contain heteroatoms interspersed in the hydrocarbon chain of the molecule. Non-limiting examples include simple glycols such as ethylene glycol, propylene glycol, diethylene glycol, dipropylene glycol, triethylene glycol, tripropylene glycol, 1,4-butanediol, 1,6-hexanediol, 1,8-octanediol, 1,10-decanediol, 1,12-dodecanediol, 2,2,4-trimethyl-1,5-pentanediol; cyclic diols such as 1,2-, 1,3-, and 1,4-cyclohexanediol, 1,4-cyclohexanedimethanol, methylolated phenols, methylolated melamines, methylolated ureas, and methylolated dicyandiamides, the later methylolated species containing minimally two methylol groups; aliphatic polyols such as glycerine, pentaerythrytol, neopentyl glycol, dipentaerythritol, trimethylolpropane, trimethylolethane; and nitrogen containing polyols such as tetrakis[2-hydroxyethyl, 2-hydroxypropyl or other hydroxyalkyl] ethylene diamines, alkanolamines, preferably diethanolamine, triethanolamine, dipropanolamine, or tripropanolamine, and the like. Particularly well suited are methylolalkylamines such as 1,1,1-tris(hydroxymethyl)-aminomethane.

Preferably used are ethylene glycol, diethanolamine, and triethanolamine, either alone, or in admixture. When heteroatoms are present interspersed in the carbon chain, they may form dative bonds with the same or adjoining metal atoms. Thus, the preferred glycolato moieties are derived from molecules corresponding to the general formulae:

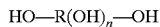

wherein R is a $C_2$–$C_{12}$ hydrocarbon radical and n may be from 0 to 6, preferably 0 to 1;

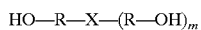

wherein R has the meaning above, m may be from 1 or 2, and X is a heteroatom, preferably sulfur, nitrogen, or phosphorous; and

wherein R, X and m may have the above defined meanings. Polyvinyl alcohol is a suitable glycolato moiety.

The glycolato polymetallooxanes may contain metal bound hydrocarbon groups, i.e. $C_1$–$C_8$ alkyl, cycloalkyl, or aryl groups, and may contain other groups, e.g. $C_1$–$C_8$ alkoxy groups. However, the glycolato polymetallooxanes should not contain, on the average, sufficient alkoxy groups to render the resulting material spontaneously flammable or rapidly hydrolyzable.

The glycolato polymetallooxanes may be "neutral", which in the context of the subject invention does not denote electrical neutrality, but denotes a molecule or mixture of molecules where each metal atom valence requirements are fulfilled such that a charged site is not created, which would then require a counterion for electrical neutrality, and be an "ionic" species as herein defined. Thus, for neutral glycolato polymetallooxanes wherein all metal atoms are silicon or germanium, each silicon or germanium atom will be covalently bonded by a total of four covalent bonds. In the case where a pair of electrons is shared between two or more metal atoms, each "bond" is counted as ½, ⅓, etc., of a bond for the purpose of assessing neutrality of the metal atom in question.

Ionic glycolato polymetallooxanes, provided they are soluble or dispersible in the volatile organic solvent, are also suitable. These polymetallooxanes are ionic by virtue of one or more metal atoms in at least some of the polymetallooxane molecules being anionic or cationic due to the number of covalent bonds not corresponding to the metal's valence requirements. An example is tetracoordinate aluminum, where an aluminum atom is covalently bonded to four oxygen atoms from two or three ethylene glycol-derived moieties, or one oxygen from an ethylene glycol-derived moiety in conjunction with three oxygens from a triethanolamine-derived moiety, in either case forming an aluminum anion. Pentavalent silicon is an additional example. In such cases, a counterion, either of the same metal having a corresponding surplus or deficiency of valence-satisfying bonds, or a metal cation or non-metal anion will also be present. Many of the glycolato polymetallooxanes will be of mixed neutral/ionic character, i.e. will have both neutral metal atoms as well as those having a formal charge.

The glycolato polymetallooxanes may be prepared by numerous methods. For example, one or more polyalkoxymetallanes, e.g. $Si(OR)_4$ or $(RO)_3Si$—O—$Si(OR)_3$ may be reacted with a glycolato producing moiety such as ethylene glycol, diethanolamine, or triethanolamine, removing alkanol (ROH) in the process. Alternatively, a metal chloride, e.g. anhydrous $AlCl_3$ or $SiCl_4$ may be reacted with glycol or a mixture of a glycol and alkanol. However, these methods suffer from the use of expensive reagents. A preferred synthesis of glycolato polymetallooxanes is the digestion of a metal oxide or appropriate mixture of metal oxides with glycol in the presence of base, i.e. sodium hydroxide, potassium hydroxide, or lithium hydroxide; more preferably, by digestion in the presence of an organic amine base; or most preferably, by co-digestion with a glycol such as ethylene glycol and a glycolato nitrogen-containing compound such as triethanolamine or 1,1,1-tris(hydroxymethyl) aminomethane.

Examples of such preparations as heretofore as heretofore described may be found in U.S. Pat. Nos. 2,881,198; 3,455,980; 5,008,422; 5,099,052; 5,416,298; and other publications such as: C. L. Frye, "Pentacoordinate Silicon Derivatives IV. Alkylammonium Siliconate Salts Derived From 1,2-Diols", J. AMER. CHEM. SOC., 92:5, Mar. 11, 1970 pp. 1205 & 1210; C. L. Frye et al. "Pentacoordinate Silicon Compounds V. Novel Silatrane Chemistry", J. AMER. CHEM.

Soc., 93:25 Dec. 15, 1971 pp. 6805–6811; K. A. Blohowiak et al., "Synthesis of Penta-Alkoxn INORG. AND ORGANOMETALLIC POLYMERS WITH SPECIAL PROPERTIES and Penta-aryloxy Silicates Directly From $SiO_2$", Kluwer Academic Publishers, Netherlands, 1992 pp. 99–111; R. M. Laine et al., "Synthesis of Pentacoordinate Silicon Complexes From $SiO_2$", Nature, vol. 353, October 1991, pp. 642–644; K. W. Chew et al., "Inorganic Polymers Derived From Silica and Alumina, An Ion Conducting Polymer From the Reaction of $BaSi(OCH_2CH_2O)_3$ with Tetraethylene Glycol", which are herein incorporated by reference.

The metals contained in the polymetallooxanes are those whose presence is desired in the metal oxide or mixed metal oxide ceramic powders. The most preferred metals include one or more magnesium, aluminum, titanium, and silicon. However other metals are also suitable, for example the alkali metals of Group Ia and alkaline earth metals of Group IIa; boron, gallium, and indium; silicon, germanium, and tin; the transition metals, particularly zirconium, hafnium, iron, cobalt, chromium, vanadium, niobium, tungsten, and zinc; and the lanthanides and actinides. When the preferred method of glycolysis is used to prepare the glycolato polymetallooxanes, commercially available oxides or minerals may be used, e.g. zirconia, titania, silica, etc. However oxides of large surface area such as those formed by precipitation from solution generally result in shorter digestion time and higher yield. It should be noted that, particularly when more than one metal oxide is used in preparing the glycolato polymetallooxanes, complex mixtures of distinct polymetallooxane species ranging from essentially monomeric to oligomeric to highly polymeric may be obtained. In some cases, even with mixed oxides, the glycolato polymetallooxane will contain a majority of well defined mixed metal glycolato polymetallooxane species.

The processes disclosed in U.S. Pat. No. 5,418,298 and copending U.S. application Ser. No. 08/371,911, herein incorporated by reference, are particularly noteworthy, as these processes use inexpensive, relatively non-toxic, and non-flammable reagents, proceed rapidly and in high yield, and produce monomeric, oligomeric, and polymeric glycolato polymetallooxanes exhibiting solubility in volatile organic solvents such that relatively high concentrations may be used, thus resulting in high space-time yield of nanosized powders.

The preferred glycolato polymetallooxanes correspond to ionic or mixed ionic/neutral polymetallooxane(s) comprising the moiety:

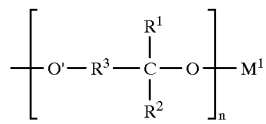

wherein $M^1$ is preferably trivalent or tetravalent B, Al, Ga or In, or tetravalent or pentavalent Si, Ge, Sn, Pb, Ti, Zr, or Hf; n is 2, 3 or 4 when $M^1$ is B, Al, Ga or In; and n is 3, 4, or 5 when $M^1$ is Si, Ge, Sn, Pb, Ti, Zr, or Hf;

$R^1$ and $R^2$ are independently selected from the group consisting of H, OH, $C_{1-8}$ alkyl, $C_{1-6}$ alkoxy, $C_{2-8}$ alkenyl, $C_{6-12}$ aryl, $C_{1-8}$ hydroxyalkyl, $C_{1-8}$ thioalkyl, $C_{2-12}$ alkoxyalkyl, $C_{4-20}$ heteroaromatic, $C_{1-10}$ alkylsilane, $C_{1-10}$ alkylsiloxane, or combinations thereof;

O' is bonded to $M^1$, $M^2$ or H wherein
  $M^2$ is preferably Si, Ge, Sn, Pb, B, Al, Ga, In, Ti, Zr, and Hf, an ammonium or phosphonium species, or a Group I or II metal of the Periodic Table;

wherein when one O' is bonded to $M^1$, n is 2 or 3 and at least one O' is bonded to $M^2$; wherein when two O' are bonded to $M^1$, n is 2 when $M^1$ is B, Al, Ga or In; wherein when one O' is bonded to $M^1$, n is 3 or 4 when $M^1$ is Si, Ge, Sn and at least one O' is bonded to $M^2$; and wherein when two O' are bonded to $M^1$, n is 3 and at least one O' is bonded to $M^2$; and $R^3$ is independently selected from the group consisting of $(CR_2)_y$, $(CR_2CR_2)_yN(CR_2)_y$, $(CR_2CR_2)_yNR(CR_2)_y$, $[(CR_2CR_2)_yO]_y$—$(CR_2)_y$, and combinations thereof wherein R is selected from the group consisting of H, OH, $C_{1-8}$ alkyl, $C_{1-6}$ alkoxy, $C_{2-8}$ alkenyl, $C_{6-12}$ aryl, $C_{1-8}$ hydroxyalkyl, $C_{1-8}$ thioalkyl, $C_{2-12}$ alkoxyalkyl, $C_{4-20}$ heteroaromatic, $C_{1-10}$ alkylsilane, $C_{1-10}$ alkylsiloxane, or combinations thereof, where y is a number from 1 to 10; and wherein said polymetallooxane contains at least one $M^2$.

Also preferred are polymetallooxane materials containing the heterocyclic moiety:

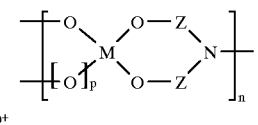

wherein $Q^+$ is a counterion when M is a charged species, M is preferably B, Al, Ga, In, Si, Ge, Sn, Pb, Ti, Zr, and Hf; wherein p may be 0, 1, or 2; wherein when M is B, Al, Ga, or In, p is 0 or 1, thus corresponding to a neutral tricoordinate or anionic tetracoordinate Group IIIa polymetallooxane moiety;

wherein when M is Si, Ge, Sn, Pb, Ti, Zr, or Hf, p is 1 or 2, thus corresponding to a neutral tetracoordinate or anionic pentacoordinate Group IVa polymetallooxane moiety; wherein $Q^+$ is an alkali metal cation, alkaline earth metal cation, an ammonium ion corresponding to the formula $R_4N^+$, or a phosphonium ion corresponding to the formula $R_4P^+$, where each R is independently selected from the group consisting of H, OH, $C_{1-8}$ alkyl, $C_{1-6}$ alkoxy, $C_{2-8}$ alkenyl, $C_{6-12}$ aryl, $C_{1-8}$ hydroxyalkyl, $C_{1-8}$ thioalkyl, $C_{2-12}$ alkoxyalkyl, $C_{4-20}$ heteroaromatic, $C_{1-10}$ alkysilane, $C_{1-10}$ alkylsiloxane, and combinations thereof; and wherein n is from 1 to about 150.

The volatile organic solvents useful in the present invention have boiling points of less than 300° C. at standard pressure, preferably less than 200° C., and most preferably 100° C. or less. The particular organic solvent or solvent mixture utilized will be in part dependent upon the solubility of the glycolato polymetallooxane. It is generally desired to contain from 1–30 weight percent glycolato polymetallooxane solids in the precursor solution, more preferably 4 weight percent to 20 weight percent, and most preferably 5 weight percent to 15 weight percent, these weight percents being based on total precursor solution weight. With these preferred concentration ranges in mind, the suitability of any particular solvent or solvent mixture may be ascertained by simply measuring the solubility of the glycolato polymetallooxane in the solvent. It is further possible to use solvent systems where the glycolato polymetallooxane is only partially soluble, provided that any remaining undissolved glycolato polymetallooxane is present in a uniform dispersion having particle sizes such that the desired metal oxide or mixed metal oxide ceramic powder may be obtained. Such dispersions may be created by dissolving glycolato polymetallooxane in a first, more powerful solvent, and slowly diluting with a poorer solvent while rapidly agitating the solution, for example with a homogenizer.

Preferred solvents are polar solvents, most preferably oxygen-containing polar solvents. Examples are methanol, ethanol, propanol, isopropanol, n-butanol, 2-butanol, hexanol, cyclohexanol, cyclopentanol, ethylene glycol, propylene glycol, diethylene glycol, dipropylene glycol, methyl cellosolve, propylcellosolve, diethylether, glyme, diglyme, 2-butanone, 2- and 3-pentanone, methylacetate, ethylacetate, propylacetate, methylbutyrate, ethylbutyrate, caprolactone, dimethyladipate, and the like. Non-polar hydrocarbons may in some cases be suitable, and in the case of many glycolato polymetallooxanes where precursor solutions of lower concentration is desired, may be admixed with other, more powerful solvents. Examples of less powerful, non-polar solvents are pentane, hexane, petroleum ether, cyclohexane, cyclopentane, and the like.

Among the solvents most preferred are the lower alkanols, e.g. methanol, ethanol, isopropanol, n-propanol, n-butanol, isobutanol, and the like. Ethanol is particularly preferred. Modest amounts of water may in some cases be useful in conjunction with one or more polar organic solvents, provided that the amount of water used does not result in phase separation of solvent or precipitation of large glycolato polymetallooxane particulates or their reaction products, and further provided that the amount of water used does not interfere with the ability to produce a stable flame in the flame pyrolysis apparatus used. Amounts of water used should preferably be less than 15 weight percent based on the weight of the precursor solution, more preferably less than 10 weight percent, and still more preferably less than 5 weight percent. Most preferably, the precursor solutions are substantially anhydrous, although it is generally not necessary to go to the trouble or expense of using completely dry glycolato polymetallooxanes or solvents, or by extensively drying the precursor solution by standard drying techniques. Thus, small amounts of water, i.e. 2 weight percent or less, is considered "substantially anhydrous."

The glycolato polymetallooxane may be first prepared, isolated in solid form, and dissolved in the solvent, generally after being finely ground, or alternatively, the desired solvent or solvent mixture may be added to the glycolato polymetallooxane immediately following synthesis. In addition to the glycolato polymetallooxane and solvent or mixture of solvents, other additives may be incorporated into the precursor solution in minor amounts. Examples include soluble metal compounds, i.e. in the form of soluble oxides, hydroxides, nitrates, acetates, etc., desired to adjust overall stoichiometry and/or incorporate trace metals in the final product for electrical, ferromagnetic, or piezoelectric properties, or for imparting color; viscosity adjusting agents to raise or lower the viscosity of the precursor solution, and surfactants to promote aerosolization or adjust aerosol particle size. Such additions are generally present in most minor amounts, i.e., less than 5 weight percent, and preferably less than 1 weight percent based on precursor solution weight.

The size of powder particles depends upon the aerosol droplet size as well as the precursor solution glycolato polymetallooxane concentration. It is preferable to maintain glycolato polymetallooxane concentration in the range of 5–15 weight percent.

Aerosolization may be accomplished by several well known technologies. For example, the precursor solution may be atomized by flow through a restrictive nozzle at high pressure, or by flow into a high volume, low pressure gas stream. When such atomizers are used, the high volume gas stream should be air, air enriched with oxygen, or preferably substantially pure oxygen. When high pressure atomization through a restrictive orifice is used, the orifice is preferably surrounded by jets of one of the above gases, preferably oxygen. More than one atomizer for aerosolization may be positioned within the flame pyrolysis chamber. Other aerosol-producing methods such as those described in the foregoing references, for example ultrasonic or piezoelectric droplet formation, may be used. However, some of these techniques may undesirably affect production rate. Ultrasonic generation is preferred, the aerosol generator generating ultrasound through reasonant action of the oxygen flow and the liquid in a chamber.

The aerosol is ignited by suitable means, for example laser energy, glow wire, electrical discharge, but is preferably ignited by means of an oxyhydrogen or hydrocarbon gas/oxygen torch. Prior to initiating combustion, the flame pyrolysis chamber is preheated to the desired operating range of 500° C. to 2000° C., preferably 700° C. to 1500° C., and most preferably 800° C. to 1200° C. Preheating improves particle size distribution and minimizes water condensation in the system. Preheating may be accomplished through the use of the ignition torch alone, by feeding and combusting pure solvent, i.e. ethanol, through the atomizer, by resistance heating or containment in a muffle furnace, combinations of these methods, or other means.

The flame pyrolysis apparatus as described herein, in conjunction with the volatile flammable organic solvent, creates a very steep temperature gradient that allows the oxide species generated by combustion to coalesce but limits the rate such that the resulting nanoparticles do not neck. The presence of water vapor in the product stream due to the combustion of solvent and organic ligands of the glycolato polymetallooxane further serves to passivate the particle surfaces, also contributing to a low degree of necking. The ultrafine particles are frequently single crystals of the desired metal oxide or mixed metal oxide.

The product particles are preferably removed by electrostatic precipitation through one or more banks of electrostatic precipitators. While such precipitators are commercially available, it has been found particularly useful to use a precipitator consisting of a stainless steel or other electrically conductive cylinder through the middle of which passes a braid of high temperature wire, i.e. chromel. It has been found that use of a braided wire is superior to single wires due to increased resistance to breakage caused by work hardening or electric arc ablation. Preferably, two or more series of electrostatic precipitators are operated in parallel, one set being emptied while others are active. The precipitators may be emptied manually, by jets of air, by mechanical shaking, or other means. The effluent gas exiting from the precipitators generally is passed through additional physical filtration devices and/or a water bath or curtain to eliminate virtually all particulates from the effluent gas stream.

The subject process may be run with high space-time yields. For example, with a laboratory scale pyrolysis chamber having twin atomizers as described hereafter, precursor solution input rates may range from 1 ml/min to 100 ml/min, preferably 5–50 ml/min, and most preferably 10–40 ml/min. At a rate of 25 ml/min which is easily sustainable, and a 10% ceramic yield, continuous production rates of up to 200 g/hour can be readily achieved. Such a unit occupies but 2 $m^2$ of bench space, and can easily be scaled up to much higher volumes. The oxygen supply must be at stoichiometry and preferably higher, adjusted on the basis of the precursor solution feed rate, volatile organic content of the precursor solution, and organic content of the glycolato polymetallooxane. Rates of 0.1 L/min to 100 L/min may be used, for example.

Having generally described this invention, a further understanding can be obtained by reference to certain specific examples which are provided herein for purposes of illustration only and are not intended to be limiting unless otherwise specified. The subject invention will now be illustrated in greater detail, first by exemplary glycolato polymetallooxane syntheses; second by a more detailed description of one embodiment of a flame spray pyrolysis device; third by exemplary pyrolyses; and finally, by the preparation of metal nitride ceramics from the ultrafine ceramic metal oxide powders.

EXAMPLES 1–4: PRECURSOR SYNTHESES

Example 1, Alumina Precursor Synthesis $Al(OH)_3.xH_2O$ was purchased from Chattem Chemical, Chattanooga, Tenn.). One kilogram of $Al(OH)_3.H_2O$ (5.6 mol as $Al_2O_3$) was added to a 5 L flask with 1.9 L of triethanolamine (TEA, 15 mol) and 2 L of ethylene glycol. The solution was heated to distill off byproduct water and ethylene glycol, resulting in a clear solution (2.5 L) after 4–6 hours. Approximately 400 mL of $H_2O$ and 1.8 L of ethylene glycol were collected as distillate. This solution can be diluted with dry ethanol to a LOI yield ranging from 96–88% and used directly for flame spray pyrolysis, or the remaining solvent can be removed and the resulting solid, which is pure $(TEA-Al)_4$ can be stored for later use. (TEA-$Al)_4$ as a solid is stable to atmospheric moisture for up to weeks to months. Solid yield of product was c.a. 570 g. This sample is designated as AP1.

Example 2, Spinel Precursor Synthesis $Al(OH)_3.xH_2O$ was purchased from Chattem Chemical, Chattanooga, Tenn.) and MgO from Aldrich Chem. Co. One kilogram of $Al(OH)_3.xH_2O$ (equivalent to 5.6 mol as $Al_2O_3$ after pyrolysis at 900° C., determined by loss on ignition) and 220 g of $MgO.xH_2O$ (5.6 mol as MgO) were added to a 5 L flask with 2.2 L of triethanolamine (TEA, 16.8 mol) and 2 L of ethylene glycol. The solution was heated to distill off byproduct water and ethylene glycol, resulting in approximately 3 L of clear solution after 4–6 hours with approximately 400 ml of $H_2O$ and 1.8 L of ethylene glycol collected as distillate. This solution can be used directly for flame spray pyrolysis, or the remaining solvent can be removed and the resulting solid, which is pure TEAHMg $(TEA-Al)_2$ can be stored for later use. Note that TEA is used in cosmetics and is not considered a hazardous or polluting material. Ethylene glycol is a major component of antifreeze. The product is designated as SP1.

Example 3, Spinet Precursor Synthesis

Magnesium metal was added to dry methanol with a trace amount of iodine. The mixture was heated slowly until a vigorous reaction was initiated. Heat was removed and the reaction went to completion, producing a clear solution with a small amount of residual gray solids. The filtered product, a solution of magnesium methoxide, was hydrolyzed with deionized $H_2O$ to precipitate magnesium hydroxide, which is stable in air. The magnesium hydroxide was dried to a constant weight at 200° C. in a muffle furnace. A stoichiometric amount (via mass balance using LOI data) of the magnesium hydroxide was combined with an aluminum hydroxide/ethylene glycol mixture along with 1 equivalent of TEA for each metal (Mg+Al). From this point forward the synthesis is identical to the large scale synthesis of spinel as described previously. The precursor, with a ceramic yield as $MgO.Al_2O_3$ of approximately 20%, is diluted in dry ethanol to a loss on ignition (LOI) yield ranging from 96–88%. This precursor is designated SP2.

Example 4, Titanatrane Glycolato, $N(CH_2CH_2O)_3TiOCH_2CH_2OH$, Synthesis

Typical reaction conditions are as follows. $TiO_2$ (15 g, 188 mmol) was mixed with one equivalent of TEA (56 g, 375 mmol) in ≈600 mL ethylene glycol in standard schlenkware equipped with a mechanical stirrer and a still head. The mixture was heated to maintain a vapor temperature≈200° C., the boiling point of ethylene glycol under $N_2$. Over an 8 hour period, ≈1 L of ethylene glycol and byproduct water were distilled off (with periodic replenishment of ethylene glycol). The starting material has a dominant effect on the reaction: commercial titania reacts modestly over the 8 hour period with 25% digestion; while a synthetic sol reacts to completion. Concurrent with distillation, the solution became clear, where the clarity of the solution indicated complete reaction and formation of the titanatrane glycolato complex. Once the solution cleared, distillation was continued to concentrate the solution until the still head temperature exceeded the boiling point of ethylene glycol (typically 205–210° C.). Ethyl alcohol is added on cooling to reduce the viscosity of the precursor. The precursor is diluted to obtain an 8–10 wt. % ceramic yield. The precursor (TP1) concentration is finally adjusted to have a drain time of 40 s in a capillary volumetric. Drain times for deionized water and ethylene glycol in the capillary are 19 s and 100 s, respectively.

Once the precursor solutions have been prepared, they are ready to undergo flame spray pyrolysis. To illustrate flame spray pyrolysis, one embodiment of the experimental apparatus used is provided. The following description is intended to be exemplary and not encompassing of all possible methods by which the invention may be practiced.

The Flame Spray Pyrolysis System

The flame spray pyrolysis system shown in the drawings consists of an aerosol generator with fluid feed and reservoir; a cylindrical quartz precursor ignition chamber 7.5 cm in diameter and 15 cm in length; a 5.0 cm diameter quartz pipe ending in a tee; four concentric wire-in-cylinder electrostatic precipitators (ESPs), 5.0 cm in diameter and 1 m in length, connected in parallel-series; and exhaust piping flow control valves located downstream of the collection zone.

Figure 3:
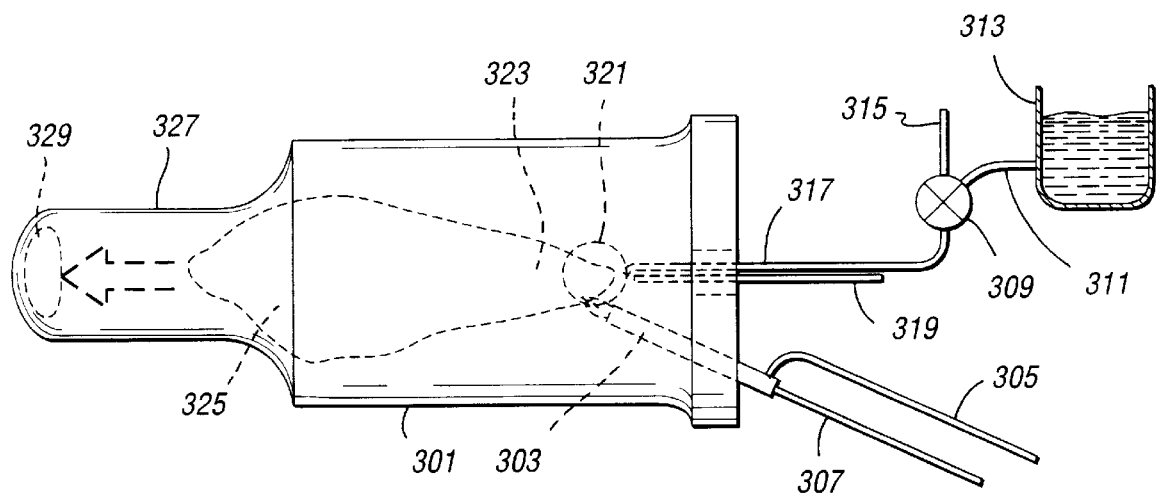
FIG. 3 illustrates one embodiment of a flame spray pyrolysis chamber.

One embodiment of a flame spray pyrolysis vessel is illustrated in FIG. 3. At 301 is the flame spray pyrolysis chamber, which is constructed of temperature-resistant material such as quartz, VYCORO® glass, ceramic, or if externally cooled, of metal. At 303 is a multichannel ceramic torch, for example of alumina, fed with oxygen or oxygen enriched gas through supply tube 305, and combustible gas, preferably hydrogen or natural gas through supply tube 307. Ceramic precursor solution is supplied through valve 309 from precursor solution supply line 311 which leads to the precursor solution tank 313. Valve 309 may be switched to an off position or to the solvent supply line 315 for purposes of preheating the chamber or during change or replenishment of the precursor solution supply tank.

From valve 309 the precursor solution or solvent flows through precursor delivery tube 317 which terminates just beyond the outlet end of oxygen delivery tube 319, forming an aerosol in the area 321 which is ignited by torch 303 to form a flame front which advances toward the opposite end of chamber 301 and forms, through decomposition and oxidation of the glycolato polymetallooxane contained in the precursor solution, a cloud of nucleating and coalescing ceramic vapor 323 which, by the time the exit tube 327 of the apparatus is reached, has formed a cloud 325 of nano-sized ceramic particles which flow out the exit 329 to the collection apparatus.

The precursor is introduced into the ignition chamber using twin high-shear (Bernoulli) aerosol generators with high velocity oxygen as the atomizing gas. The aerosol generator consists of a 0.4 mm (i.d.) precursor delivery tube oriented orthogonally to the oxygen flow from a 0.8 mm (i.d.) tube (FIG. 3b). Twin aerosol generators were used to maintain high throughput and stabilize the flame. Ignition at each aerosol generator is accomplished using a natural gas/oxygen pilot torch. Torch tip temperatures can exceed 2000° C. The torch was fabricated from a 15 mm (o.d.) multichannel alumina tube to avoid metallic contamination of the powder which may occur using a stainless steel torch. System temperatures are monitored by Pt-Pt 13% Rh thermocouples (TA instruments, New Castle, Del.) inserted directly into the product stream, 50–100 cm downstream from the ignition chamber (FIG. 3a); the upper use temperature of the thermocouples does not allow placement in the combustion zone.

Figure 4:
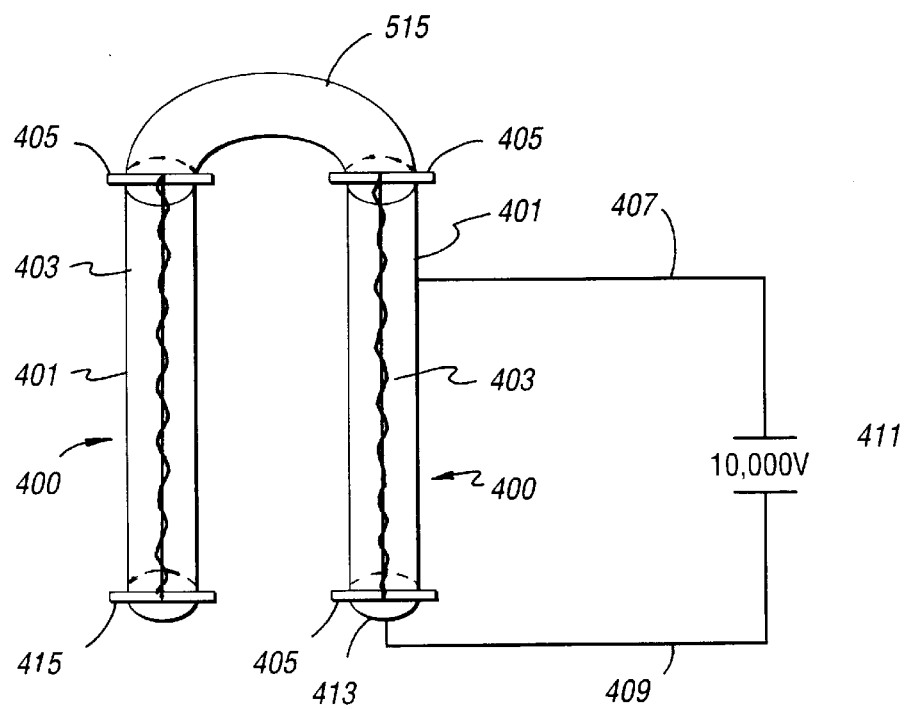
FIG. 4 illustrates one embodiment of an electrostatic precipitator.

The ultrafine powders are collected using a parallel-series arrangement of wire-in-cylinder electrostatic precipitators (ESPs) (FIG. 4). A rectified, 5000–10,000 volt bias, supplied by a transformer (Franceformer, Chicago, Ill.), is applied across the 2.5 cm gap between a 26 gauge braided alumel wire and the concentric wall of the stainless steel cylinder, inducing a charge on the particles and causing them to adhere to both the wall and the wire (independent of bias direction). The extremely fine nature of the particles and correspondingly low bulk density leads to rapid filling of the ESPs and restriction of product gas flow. Ceramic powder product is collected by isolating part of the collection system and substituting clean ESPs for the filled ones without altering the combustion occurring upstream. At high production rates, >75 g/h, each ESP series is replaced for every liter of precursor throughput, at intervals of approximately 1 hour, alternating replacement of each ESP every 500 ml or approximately ½ hour. Lower production rates do not require as frequent replacement of the ESPs. Powder collected in the ESPs accounts for approximately 65–75% of total powder production. The remaining powder is collected on the walls of the system or passes through the system to a water scrubber, which prevents powder from exhausting to the atmosphere.

In FIG. 4 is shown one embodiment of a bank of series connected electrostatic precipitators 400 which may be stainless steel tubes 401 containing within them one or more metal wires, preferably metal wire braids 403 insulated from the steel tubes 401 by being tensioned on glass rods 405 or other insulative means. Electrical leads 407 and 409 connect the tubes 401 and wires 403 to opposing polarities of an electrostatic voltage source 411. The inlet end 413 of the electrostatic precipitator is connected to the outlet end of the flame spray pyrolysis apparatus, while the outlet end 415 is connected to further filtration means, for example a water bath or curtain or series of physical filters, i.e. of fiberglass. Glass U-joint 515 connects the two precipitators. Tubes 401 need not be of stainless steel, but may also be glass having a conductive coating disposed on the interior surface.

The flame spray pyrolysis system, described above, is effective at handling throughputs greater than 1000 ml of solution containing 5–10 weight % solids per hour. Much higher rates are anticipated to be possible with simple increases in the dimensions of the reactor and a higher throughput aerosol generator. The precursor (glycoloato polymetallooxane) viscosity is lowered by ethanol addition, which also serves as an energy source for the combustion reaction. The precursor is introduced into a combustion chamber via an aerosol generator, shown in FIG. 3, where the individual droplets are combusted rapidly, resulting in the production of crystalline, homogeneous, ultrafine powder.

Figure 5:
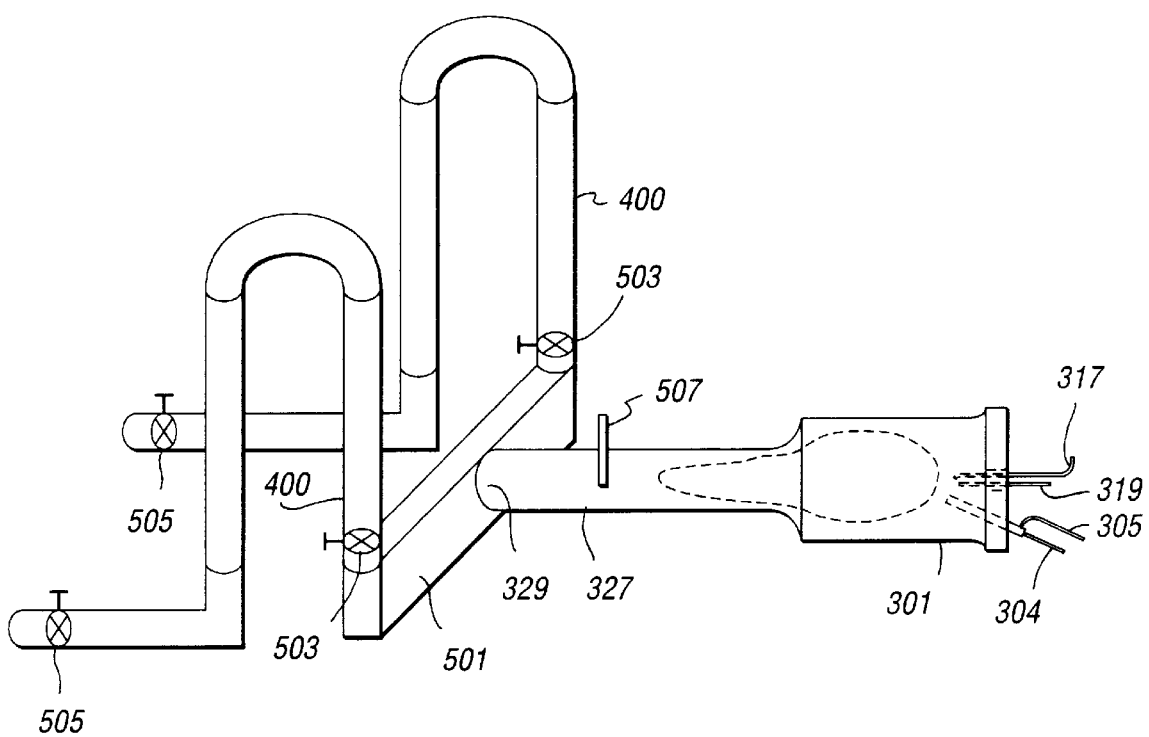
FIG. 5 illustrates one embodiment of a flame spray pyrolysis apparatus including flame spray pyrolysis chamber, electrostatic precipitators, and shut-off valves.

In FIG. 5 is one embodiment of a complete flame spray pyrolysis apparatus and parallel arrangement of series-connected precipitators. For details of the latter two devices, reference may be had to FIGS. 3 and 4. In FIG. 5, the outlet end 329 of the flame pyrolysis exit tube 327 is connected to a tee 501 at both ends of which are located electrostatic precipitators 400, connected to the tee through shut off valves 503. A thermocouple 507 is positioned in the exit tube 327 for purposes of monitoring temperature. At the outlet ends of electrostatic precipitators 400 are flow control shutoff valves 505 which may be closed when disconnecting and/or emptying a given electrostatic precipitator.

Prior to precursor flame spray pyrolysis, the system is preheated using the ignition torches to avoid condensing byproduct water in the system. Pure ethanol is fed through the aerosol generators to finish preheating the combustion chamber to operating temperatures (800–1200° C.). When the system reaches equilibrium, approximately 5 minutes, the aerosol generator feed is switched to the precursor. Precursor flow rate is controlled by head pressure generated by a compressed nitrogen tank as well as the precursor solution viscosity. No direct correlation between head pressure and precursor flow rate was determined. Substitution of a pump or other means of metered precursor may be desirable.

The precursor solution feed rate determines the combustion chamber temperatures as it is the primary energy source for the reaction. The total production rate is currently limited by the rate of heat dissipation of the system. Normal operating throughput using the present configuration is 20 ml/min, producing 50–100 g/h of ceramic powder depending on the concentration of solids in solution. Total continuous production using SP1 was greater than 1000 g; as such, some process variability was unavoidable. Examples of process variability include fluctuations in precursor flow rate 20±5 ml/min and temperature fluctuations ranging from 1100 to 1600 K depending on flow rate, precursor system and solvent. Total production for SP2 was 50 g due to the limited amount of precursor synthesized. In contrast, a production of titania from a TEA-Ti complex provided rates of 150 g/h.

The following analytical methods were utilized.

Loss On Ignition (LOI). The LOIs of the solutions were obtained using a TA Instruments (New Castle, Del.) Thermal Analyst 2200 equipped with a Hi-Res TGA 2950 Thermogravimetric Analyzer. TGA samples, 80–90 mg of solution in platinum pans, were heated at 20° C./min to 900° C. in a 50 cc/min synthetic air flow.

Powder X-Ray Diffraction (XRD). The flame spray pyrolysis product powders were analyzed by powder x-ray diffraction using a Rigaku 2θ Double Crystal Wide Angle Goniometer (Tokyo, Japan). Specimens (0.1–0.2 g) were packed in a glass specimen holder and placed in the diffractometer. Full scans were measured from 5–80° 2θ at a scan speed of 5° 2θ/min in 0.05° 2θ increments using Cu (Kθ) radiation operated at 40 kV and 100 Amps. The Debye-Scherrer crystallite sizes determined from peak broadening were obtained at a scan speed of 0.5° 2θ/min in 0.01° 2θ increments. Peak positions were compared with standard JCPDS files, 21–1152 and 16–394 for spinel and δ-alumina, respectively, to identify crystalline phases.

Surface Area and Microporosimetry. Surface area and microporosimetry analyses were done at 77 K using a Micromeritics ASAP 2000M (Norcross, Ga.) with $N_2$ as the adsorbate gas. Prior to analysis, samples were degassed at 400° C. under high vacuum. Surface areas were calculated using the BET multipoint method. Micropore analysis was done using differential functional theory (DFT) with slit-like pores in carbon as the model, thus pore sizes are reported as pore widths.

TEM. TEM analyses were done on a JEOL 2000FX (Tokyo, Japan) operating at 200 keV. Samples for TEM were prepared by ultrasonicating 0.1 g of the collected powder in 50 ml of methanol, depositing a drop of the suspension on a carbon coated copper grid, and allowing the methanol to evaporate.

SEM. SEM was done on an Hitachi S-800 (Tokyo, Japan) microscope operating at 5 keV accelerating voltage. Samples for SEM were prepared by ultrasonicating 0.1 g of the collected powder in 50 ml of methanol and depositing a drop of the suspension on an aluminum stub. SEM samples were sputter coated with a layer of Au/Pd for 60 s at 10 mV, to avoid particle charging.

Figure 6A:
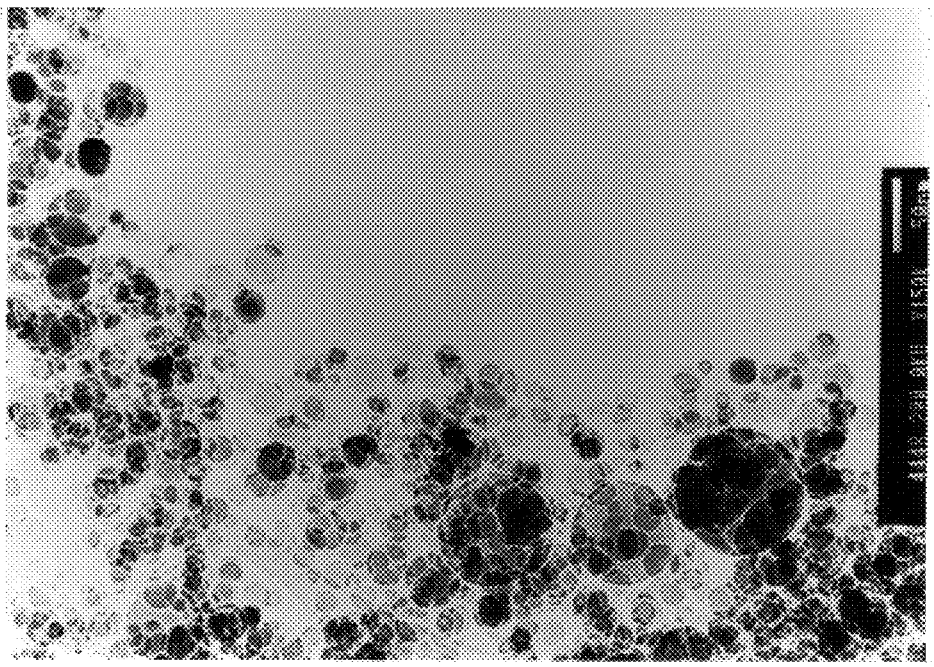
FIG. 6a is a TEM (x150K) of spinel powders formed from SP1 precursor solution.
Figure 6B:
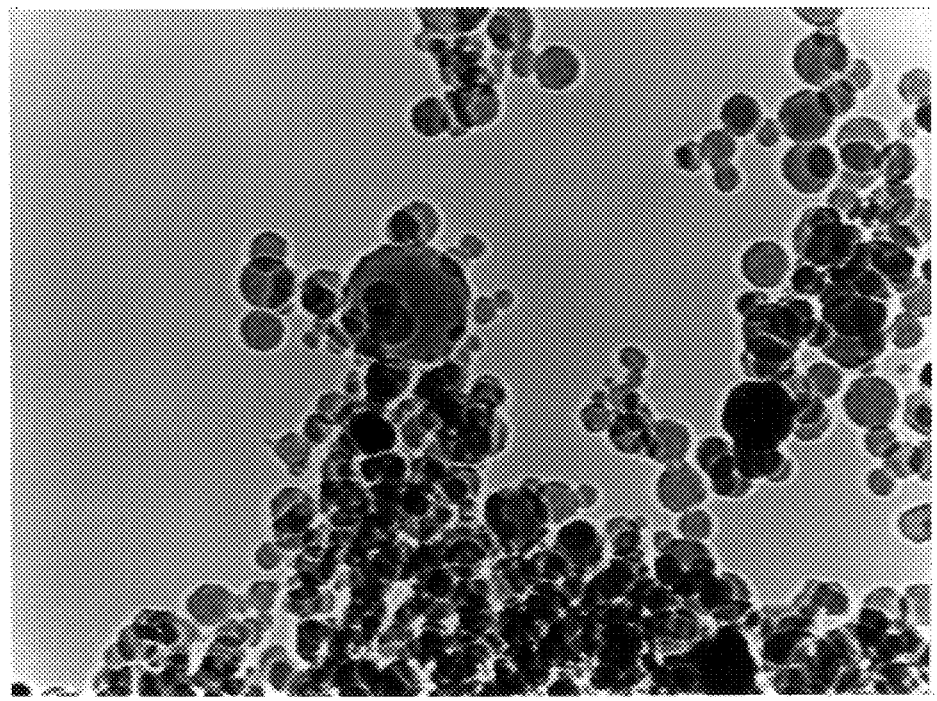
FIG. 6b is a TEM (x150K) of spinel powders formed from SP2 precursor solution.
Figure 7A:
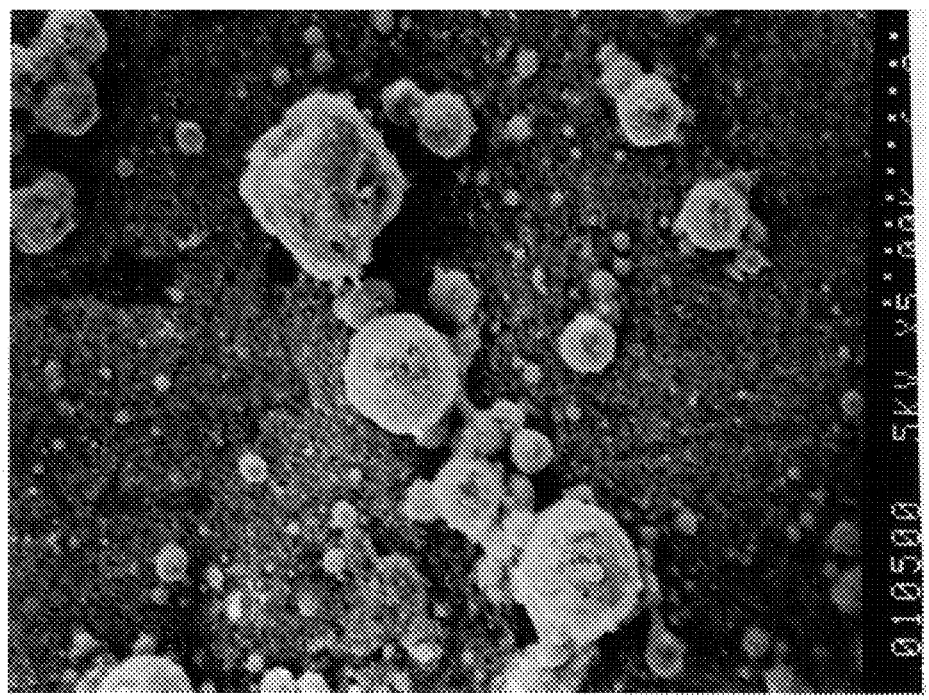
FIG. 7a is an SEM (x5K) of spinel powders formed from SP1 precursor solution.
Figure 7B:
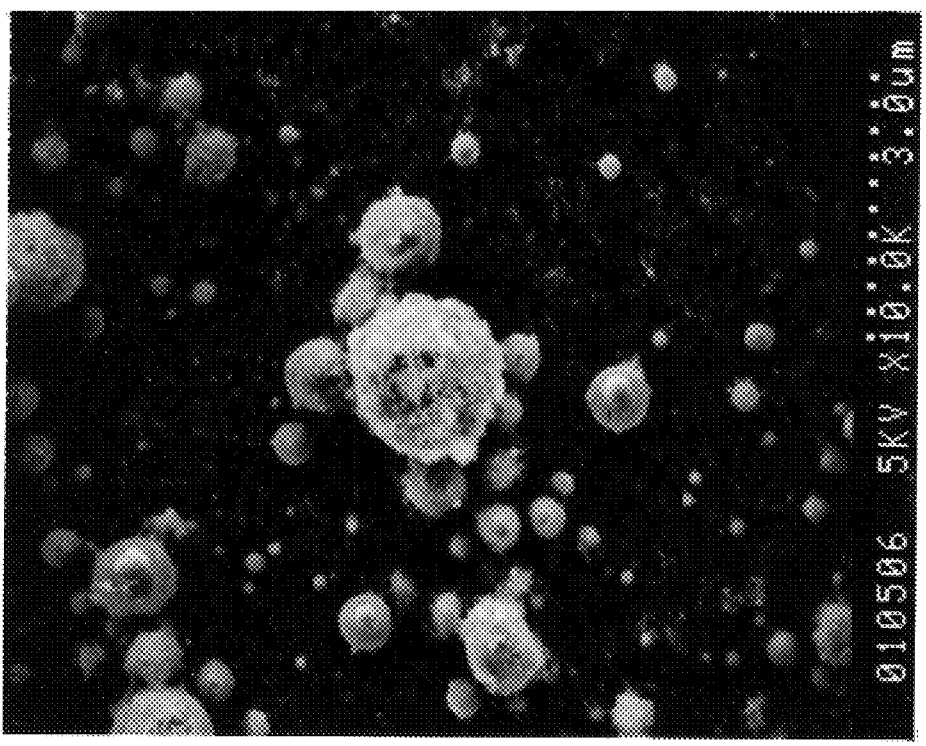
FIG. 7b is an SEM (x10K) of spinel powders formed from SP2 precursor solution.
Figure 8:
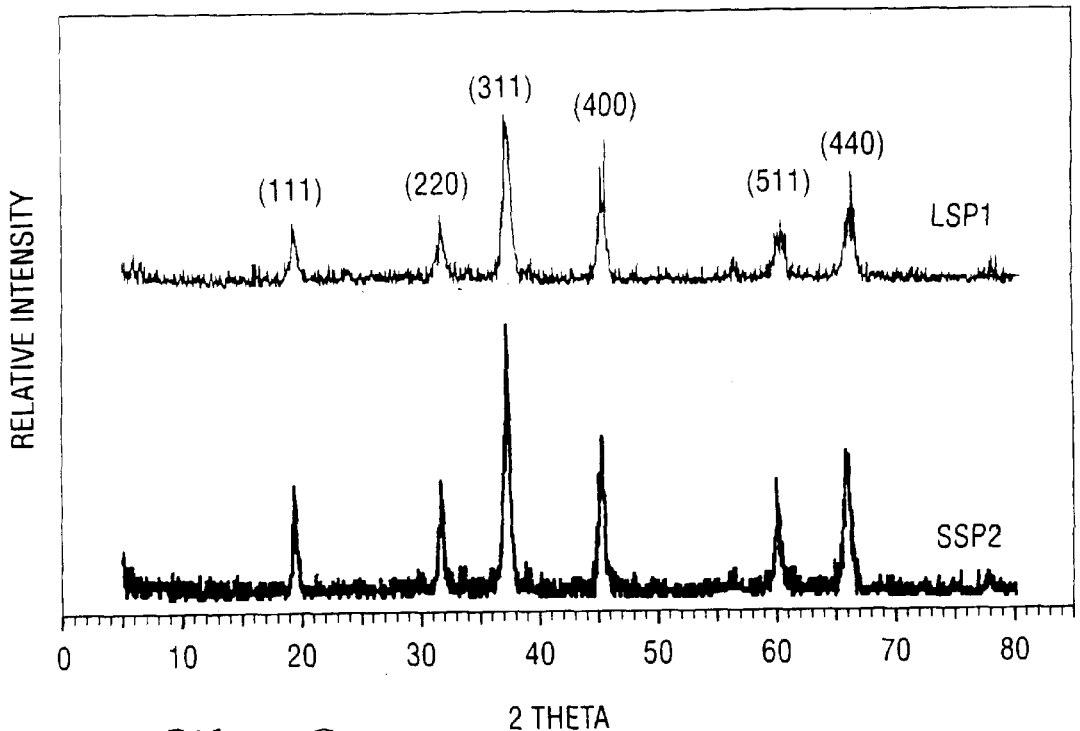
FIG. 8 contains X-ray diffraction spectra of ceramic powders formed from SP1 and SP2 precursor solutions.
Figure 10:
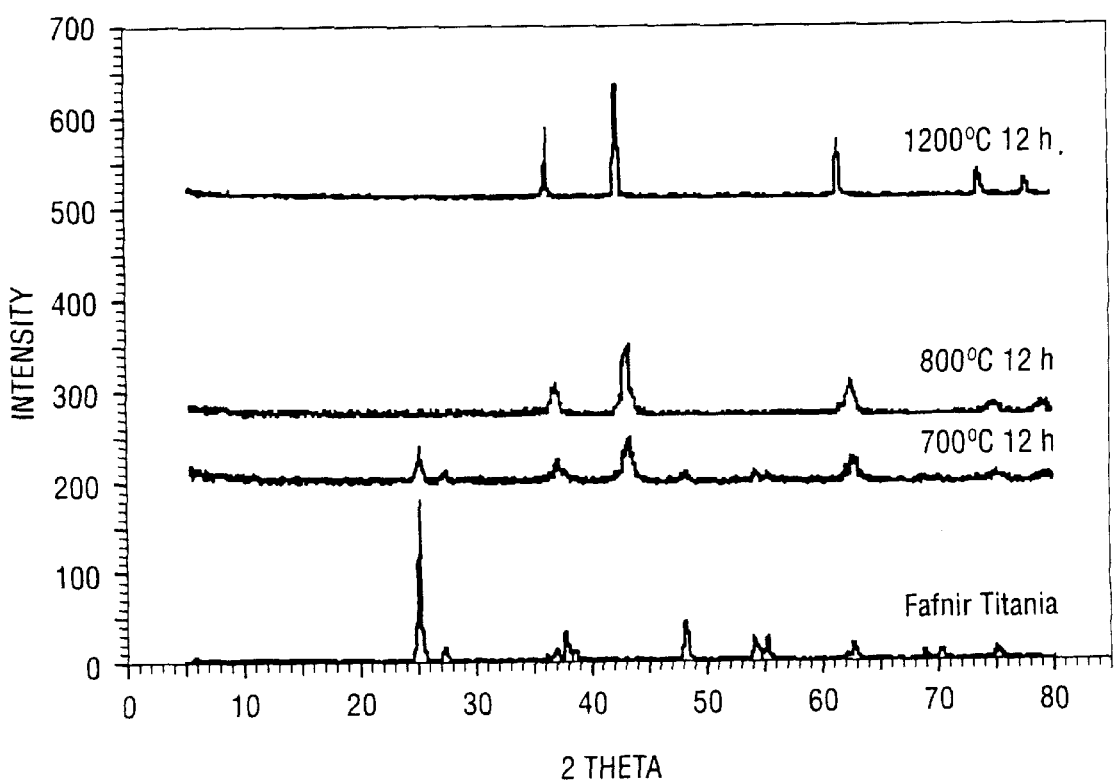
FIG. 10 contains X-ray diffraction spectra of titanium nitride prepared by ammonolysis of titania powder at various temperatures.
Figure 9A:
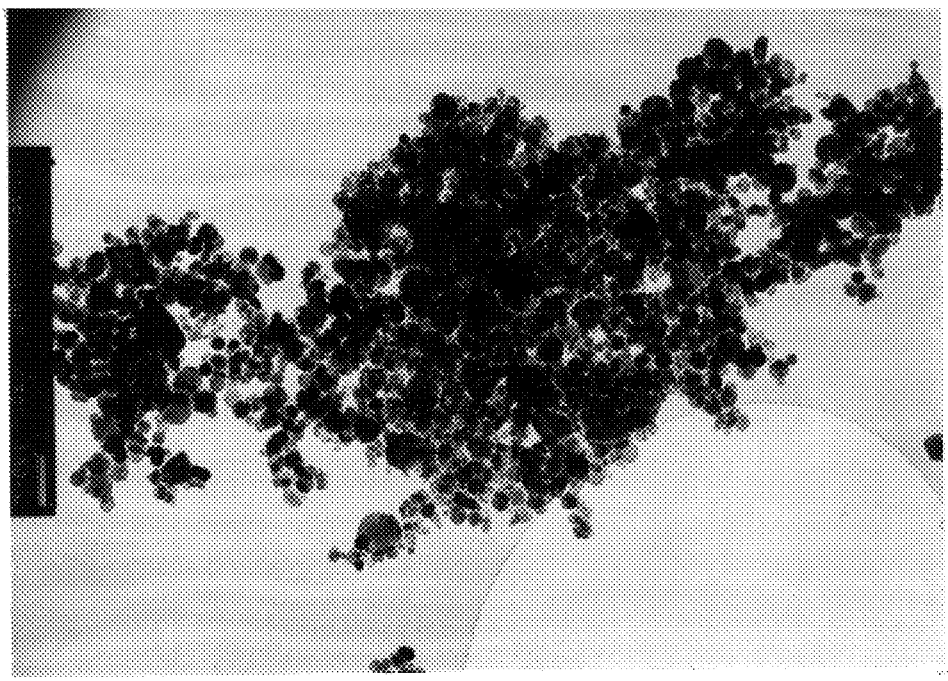
FIGS. 9a and 9b are TEM (x50K) of titania powder and TEM (x100K) of titanium nitride, respectively, prepared in accordance with the subjection invention.
Figure 9B:
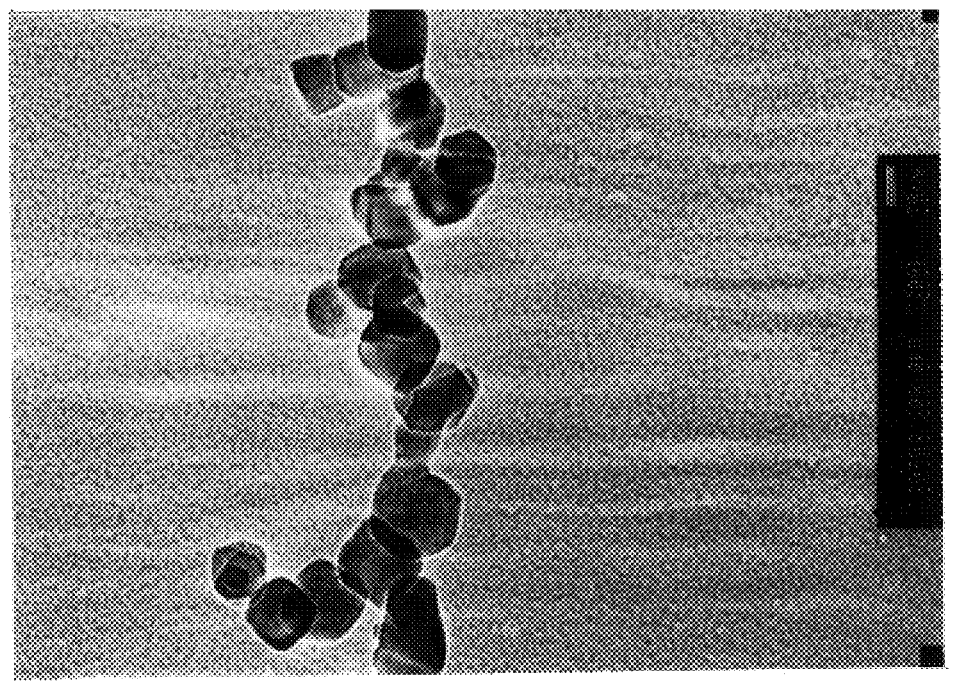

Powder Characterization. The ultrafine spinel and alumina powders produced using the flame spray pyrolysis process are found to be dense, crystalline and spherical, as detailed below. The particles range in size primarily from 10–100 nm. with some much larger particles seen in the SEM micrographs. Reaction conditions and results are summarized in Table I. FIGS. 6a and 7a are TEM and SEM photomicrographs of powders formed from the SP1 precursor, while FIGS. 6b and 7b are TEM and SEM photomicrographs of SP2 derived powders. FIG. 8 contains the X-ray diffraction spectrum of these powders, while FIGS. 9a and 9b are the TEM photomicrographs, respectively, of titania powder prepared from TP1 precursor and TiN powder prepared by ammonolysis as set forth below.

normally closed solenoid operated by a safety circuit. Conversion of the titania to titanium nitride proceeded well at temperatures ranging from 800° C. to 1200° C. as shown by the x-ray diffraction spectrum presented in FIG. 10.

Having now fully described the invention, it will be apparent to one of ordinary skill in the art that many changes and modifications can be made thereto without departing from the spirit or scope of the invention as set forth herein.

What is claimed is:

1. A process for the preparation of ultrafine metal oxide or mixed metal oxide ceramic particles having mean particle sizes in the range of 2–500 nm, said process comprising:
   a) aerosolizing a ceramic precursor solution comprising one or more glycolato polymetallooxanes in a volatile organic solvent or volatile flammable organic solvent mixture, said glycolato polymetallooxane(s) present in said volatile solvent(s) in an amount of from 1 weight percent to 30 weight percent of said ceramic precursor solution, said glycolato polymetallooxane(s) having bound therein in excess of 90% of the metal content of said metal oxide or mixed metal oxide, to form a ceramic precursor solution aerosol containing droplets of said ceramic precursor solution;
   b) supplying oxygen to said ceramic precursor solution aerosol in an amount at least stoichiometrically equivalent to combustible material contained in said ceramic precursor solution aerosol to form an aerosol and oxygen mixture;
   c) igniting said aerosol an oxygen mixture and forming metal oxide or mixed metal oxide ceramic particles thereby and a gaseous effluent containing products of combustion; and
   d) separating said metal oxide or said mixed metal oxide ceramic particles from said gaseous effluent to recover an ultrafine ceramic particle product.

2. The process of claim 1 wherein at least one of said gycolato polymetallooxanes is prepared by the digestion of one or more metal oxides with a glycolato-providing moiety.

3. The process of claim 2 wherein said gycolato-providing moiety is selected from the group consisting of aliphatic hydroxyl-functional compounds having from two to four hydroxyl groups attached to one or more $C_{1-12}$ aliphatic hydrocarbon residues.

4. The process of claim 3 wherein at least one of said gycolato-providing moieties is selected from the group

TABLE I

SUMMARY OF THE REACTION CONDITIONS
AND RESULTS OF FLAME SPRAY PYROLYSIS

| Precursor | Solution Dissolved Solids | Flow Rate (ml/min) | Reaction Temp. | Debye-Scherrer Particle Size | SSA | SSA Equiv. Spherical Data |
|---|---|---|---|---|---|---|
| SP1 | 8–10% | 18–20 | 1200–1400K | 24 nm | 59 m$^2$/g | 28 nm |
| SP2 | 4% | 17 | 880–1000K | 36 nm | 40 m$^2$/g | 42 mm |
| TP1 | 7% | 19 | 1300–1500K | 17 nm | 86 m$^2$/g | 18 nm |

Ammonolysis. Ammonolysis of titania powder (0.5 g) was performed with a mechanically agitated fixed bed process tube made of fused quartz. The process tube consists of a horizontal tube (13 mm I.D.×5 cm) supported by a gas inlet (7 mm I.D.×42 cm) and a similar exit tube, and mounted vertically in a tube furnace (Carbolyte CTF 12/65, Bamford Mill, Sheffield, England) situated in a fume hood. Anhydrous ammonia was metered, as received, through consisting of dialkanolamines, trialkanolamines and 1,1,1-tris(hydroxymethyl)aminomethane.

5. The process of claim 1 wherein said volatile, flammable organic solvent is selected from organic solvents having a boiling point lower than 300° C.

6. The process of claim 5 wherein said volatile, flammable organic solvent is an oxygen-containing organic solvent.

7. The process of claim 6 wherein said oxygen-containing solvent is a solvent boiling below 100° C. selected from the group consisting of the lower $C_{1-6}$ aliphatic and cycloaliphatic alcohols, ethers, ketones and esters.

8. The process of claim 6 wherein said oxygen-containing solvent comprises a $C_{1-6}$ aliphatic alcohol.

9. The process of claim 1 wherein said aerosolization is effected by directing a stream of ceramic precursor solution into a fast moving stream of gas comprising oxygen.

10. The process of claim 1 wherein said step of igniting is performed by igniting means selected from the group consisting of an oxyhydrogen torch, a hydrocarbon gas and oxygen torch, a glow wire, an electrical discharge, and laser energy.

11. The process of claim 1 wherein said aerosolization, said supplying of oxygen and said igniting take place in a flame pyrolysis chamber wherein the temperature in the proximity of a flame front provided by said igniting is at least 500° C.

12. The process of claim 11 wherein connected downstream from said flame pyrolysis chamber is/are one or more electrostatic precipitators.

13. The process of claim 12 wherein at least two electrostatic precipitators are employed in parallel, said electrostatic precipitators having shut-off means associated with said precipitators located between said precipitators and said flame pyrolysis chamber, said shut-off means effective when closed to substantially prevent passage of effluent gas and ceramic particles into said electrostatic precipitators, the process further comprising closing at least one of said shut-off means and removing ceramic particles from said electrostatic precipitator while one shut-off means associated with at least one electrostatic precipitator remains open providing an exit for effluent gas and ceramic particles from said flame pyrolysis chamber.

14. The process of claim 1 wherein said ceramic metal oxide or mixed metal oxide particles are converted into metal nitride or mixed metal nitride particles respectively by treating said particles with anhydrous ammonia at a temperature of from 500° C. to 2000° C. until substantially all metal oxides are converted to metal nitrides.

15. The process of claim 1 further comprising dispensing said ultrafine ceramic particle product in a further ceramic precursor solution, repeating steps (a) through (d) to recover a ceramic particle product having larger mean particle size than said ultrafine ceramic particle product.

16. The process of claim 15 wherein the mean particle size of said ceramic particle product is from greater than 500 nm to 20 μm.

17. The process of claim 1 wherein said glycolato polymetallooxane comprises a polymetallooxane comprising the moiety:

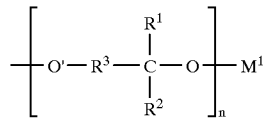

wherein $M^1$ is selected from the group consisting of trivalent or tetravalent B, Al, Ga or In, or tetravalent, pentavalent, or hexavalent Si, Ge, Sn, Pb, Ti, Zr, and Hf; n is 2, 3 or 4 when $M^1$ is B, Al, Ga or In; and n is 3, 4, 5, or 6 when $M^1$ is Si, Ge, Sn, Pb, Ti, Zr, or Hf;

$R^1$ and $R^2$ are independently selected from the group consisting of H, OH, $C_{1-8}$ alkyl, $C_{1-6}$ alkoxy, $C_{2-8}$ alkenyl, $C_{6-12}$ aryl, $C_{1-8}$ hydroxyalkyl, $C_{1-8}$ thioalkyl, $C_{2-12}$ alkoxyalkyl, $C_{4-20}$ heteroaromatic, $C_{1-10}$ alkylsilane, $C_{1-10}$ alkylsiloxane and combinations thereof;

O' is bonded to $M^1$, $M^2$ or H wherein $M^2$ is selected from the group consisting of Si, Ge, Sn, Pb, B, Al, Ga, In, Ti, Zr, and Hf, an ammonium or phosphonium species, or a Group Ia or IIa metal of the Periodic Table;

wherein when one O' is bonded to $M^1$, n is 2 or 3 when $M^1$ is B, Al, Ga, or In and at least one O' is bonded to $M^2$; wherein when two O' are bonded to $M^1$, n is 2 when $M^1$ is B, Al, Ga or In; wherein when one O' is bonded to $M^1$, n is 3, 4, or 5 when $M^1$ is Si, Ge, Sn, Pb, Ti, Zr, or Hf and at least one O' is bonded to $M^2$; and wherein when two O' are bonded to $M^1$ and $M^1$ is Si, Ge, Sn, Pb, Ti, Zr, or Hf, n is 3 or 4 and at least one O' is bonded to $M^2$; and $R^3$ is independently selected from the group consisting of $(CR_2)_y$, $(CR_2CR_2)_yN(CR_2)_y$, $(CR_2CR_2)_yNR(CR_2)_y$, $[(CR_2CR_2)_yO]_y$—$(CR_2)_y$, and combinations thereof wherein R is selected from the group consisting of H, OH, $C_{1-8}$ alkyl, $C_{1-6}$ alkoxy, $C_{2-8}$ alkenyl, $C_{6-12}$ aryl, $C_{1-8}$ hydroxyalkyl, $C_{1-8}$ thioalkyl, $C_{2-12}$ alkoxyalkyl, $C_{4-20}$ heteroaromatic, $C_{1-10}$ alkylsilane, $C_{1-10}$ alkylsiloxane and combinations thereof, and where y is a number from 1 to 10 and wherein said polymetallooxane contains at least one $M^2$.

18. The process of claim 1 wherein said glycolato polymetallooxane comprises the heterocyclic moiety:

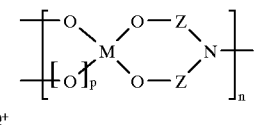

wherein M is B, Al, Ga, In, Si, Ge, Sn, Pb, Ti, Zr, of Hf; wherein when M is B, Al, Ga, or In, p is 0 or 1; and when M is Si, Ge, Sn, Pb, Ti, Zr, or Hf, p is 1, 2, or 3; when M is B, Al, Ga, or In and p is 1, $Q^+$ is a group Ia, group IIa or ammonium or phosphonium moiety, and when M is Si, Ge, Sn, Pb, Ti, Zr, or Hf and p is 2 or 3, $Q^+$ is a group Ia, group IIa or ammonium or phosphonium compound;

wherein when $Q^+$ is $R_4N^+$ or $R_4P^+$, R is independently selected from the group consisting of H, OH, $C_{1-8}$ alkyl, $C_{1-6}$ alkoxy, $C_{2-8}$ alkenyl, $C_{6-12}$ aryl, $C_{1-8}$ hydroxyalkyl, $C_{1-8}$ thioalkyl, $C_{2-12}$ alkoxyalkyl, $C_{4-20}$ heteroaromatic, $C_{1-10}$ alkylsilane, $C_{1-10}$ alkylsiloxane and combinations thereof and wherein n is from 1 to about 150.

* * * * *